(12) United States Patent
Laseter

(10) Patent No.: US 12,239,054 B2
(45) Date of Patent: Mar. 4, 2025

(54) SEED/SEEDLING PROTECTION DEVICE

(71) Applicant: William Scott Laseter, Atlanta, GA (US)

(72) Inventor: William Scott Laseter, Atlanta, GA (US)

( * ) Notice: Subject to any disclaimer, the term of this patent is extended or adjusted under 35 U.S.C. 154(b) by 84 days.

(21) Appl. No.: 17/862,489

(22) Filed: Jul. 12, 2022

(65) Prior Publication Data

US 2023/0016989 A1 Jan. 19, 2023

Related U.S. Application Data

(60) Provisional application No. 63/221,093, filed on Jul. 13, 2021.

(51) Int. Cl.
*A01G 13/04* (2006.01)

(52) U.S. Cl.
CPC .................. *A01G 13/043* (2013.01)

(58) Field of Classification Search
USPC ...... 47/31.1, 32, 32.4, 32.5, 32.3, 32.6, 241, 47/29.1, 29.7, 30, 20.1, 32.7, 32.8
See application file for complete search history.

(56) References Cited

U.S. PATENT DOCUMENTS

| | | | | |
|---|---|---|---|---|
| 104,418 A | * | 6/1870 | Brunson | A01G 13/105 47/32.5 |
| 325,184 A | * | 8/1885 | Nichols | A01G 13/0243 47/32.4 |
| 407,532 A | * | 7/1889 | Juette | A01G 13/0243 47/32.4 |
| 557,905 A | * | 4/1896 | Smith | A01G 13/0243 47/32.4 |
| D25,490 S | * | 5/1896 | Orner | 47/30 |
| 592,640 A | | 10/1897 | Orner | |
| 612,585 A | * | 10/1898 | Flammer | A01G 13/0243 47/32.4 |
| 757,045 A | * | 4/1904 | Lane | A01G 13/04 47/31.1 |
| 878,233 A | * | 2/1908 | Paulson | Y10S 135/906 211/74 |
| 1,161,380 A | | 11/1915 | Denker | |
| 1,299,870 A | * | 4/1919 | Stevenson | A01G 13/0243 47/30 |

(Continued)

FOREIGN PATENT DOCUMENTS

DE 3002179 A1 8/1980
WO WO2001054485 8/2001

OTHER PUBLICATIONS

Glassicartistry, Garden Cloche DIY Tutorial, https://glassictouch.com/2018/07/02/garden-cloche-diy-tutorial/, Jul. 2, 2018.

(Continued)

*Primary Examiner* — Andrea M Valenti
(74) *Attorney, Agent, or Firm* — Offit Kurman; Douglas L. Lineberry

(57) ABSTRACT

Described herein are biodegradable, encircling protective devices used to protect seeds and saplings during their greatest vulnerability after germination while promoting growth of the sapling, preventing detritus and competing plants from fouling growth, and simultaneously fending off predation from herbivores or omnivores, which devices melt when exposed to controlled fire without harmful side effects.

20 Claims, 25 Drawing Sheets

(56) References Cited

U.S. PATENT DOCUMENTS

| | | | | |
|---|---|---|---|---|
| 1,584,302 | A | | 5/1926 | Kakiuchi |
| 1,600,969 | A | * | 9/1926 | Beers .................... B65D 85/00 |
| | | | | 248/524 |
| 1,635,449 | A | * | 7/1927 | Wilson .................... A01G 13/04 |
| | | | | 47/31.1 |
| 1,704,801 | A | | 3/1929 | Mitchell |
| 1,926,053 | A | | 9/1933 | Morgan |
| 2,184,904 | A | * | 12/1939 | Boehme .................... A01G 9/28 |
| | | | | 47/33 |
| 2,441,649 | A | * | 5/1948 | Sprague ................. B65D 35/38 |
| | | | | 222/566 |
| 3,214,865 | A | * | 11/1965 | Rosenvold et al. ... A01G 13/04 |
| | | | | 47/29.2 |
| 4,697,312 | A | * | 10/1987 | Freyer ................ B65D 33/1625 |
| | | | | 24/30.5 R |
| 5,195,715 | A | * | 3/1993 | Cone .................. A47G 33/1206 |
| | | | | 248/526 |
| 5,347,750 | A | * | 9/1994 | Mills ....................... A01G 13/10 |
| | | | | 47/32.4 |
| 5,471,783 | A | * | 12/1995 | McLean ............. A01G 13/0243 |
| | | | | 47/30 |
| D378,287 | S | * | 3/1997 | Alligood ........................ D11/143 |
| 6,018,908 | A | * | 2/2000 | Charrin et al. ......... A47G 7/063 |
| | | | | 47/41.01 |
| 6,681,519 | B2 | * | 1/2004 | Cone .................. A47G 33/1206 |
| | | | | 248/539 |
| 7,287,474 | B2 | * | 10/2007 | Whitley .................... F42B 4/20 |
| | | | | 248/125.7 |
| D566,292 | S | * | 4/2008 | Gibbs .......................... D25/119 |
| 7,651,073 | B1 | * | 1/2010 | Gibbs ................... E04H 17/143 |
| | | | | 256/65.02 |
| 8,683,741 | B2 | | 4/2014 | Castagno et al. |
| 9,814,188 | B2 | | 11/2017 | Almudhyan |
| D815,978 | S | * | 4/2018 | Ayaskan ...................... D11/152 |
| D894,037 | S | * | 8/2020 | Jenkins ........................ D11/155 |
| D921,527 | S | * | 6/2021 | Jenkins ........................ D11/152 |
| D945,920 | S | * | 3/2022 | Tice ............................. D11/143 |
| 2009/0277081 | A1 | * | 11/2009 | Georges ............. A01G 13/0243 |
| | | | | 47/20.1 |
| 2012/0291344 | A1 | * | 11/2012 | Castagno ............. A01G 13/043 |
| | | | | 47/20.1 |
| 2013/0306674 | A1 | * | 11/2013 | Read ........................ A23G 3/28 |
| | | | | 222/566 |
| 2014/0083001 | A1 | * | 3/2014 | Alcov .................. A01G 13/105 |
| | | | | 47/20.1 |
| 2018/0077878 | A1 | * | 3/2018 | Sands .................. A01G 9/0291 |
| 2021/0115697 | A1 | * | 4/2021 | Luczycki ............ E04H 17/1439 |

OTHER PUBLICATIONS

Gamplers, Poly Cone Plant Protectors, https://gemplers.com/collections/tree-wraps-guards/products/poly-cone-plant-protectors-set-of-4?variant=21171245088857, May 17, 2021.

Plant Knight, Plant Knight Tree Trunk Guard Protector, May 17, 2021, https://www.amazon.com/Plant-protector-landscape-expandable-protection/dp/B07CCZ8822/ref=asc_df_807CCZ8822/?tag=hyprod-20&linkCode=df0&hvadid=242015693684&hypos=&hvnet.

\* cited by examiner

SEED/SEEDLING PROTECTION DEVICE

TECHNICAL FIELD

The subject matter disclosed herein is generally directed to biodegradable, encircling protective device used to protect directly seeded longleaf pine (Pinus palustris) seeds and resulting seedlings during their greatest vulnerability beginning at planting and continuing for several weeks after germination, while allowing unimpeded growth of the germinant, limiting interference from detritus and competing plants, and simultaneously deterring predation from herbivores or omnivores during deployment, and melting without producing toxins when exposed to a prescribed burn in the course of routine forestry practice. While optimized for longleaf, the disclosed SEED CROWN™ devices may also be used for reforestation or other planting of a variety of plant species.

BACKGROUND

Longleaf once dominated more than 90 million acres of mostly coastal plain forest stretching from southeast Virginia to east Texas. The longleaf savannah forest type has nearly vanished due to over-harvesting, exclusion of fire on which it depended, and other environmental factors. Despite its reduced distribution, much enthusiasm for longleaf remains owing to the tree's unique timber and ecological attributes.

Less well-known is the fact that significant investments were made in direct seeding Longleaf from about 1930 to 1980. However, heavy predation losses and overtaxed seed sources made direct seeding unreliable. As a result, today longleaf is regenerated almost exclusively with planted seedlings started in nurseries. The expense and logistical requirements of those methods make longleaf impractical for many reforestation projects, especially those involving small acreage, difficult to access sites, or conservation projects. For more on Longleaf in general, see: https://Longleafalliance.org/

Given the value of longleaf and other difficult-to-regenerate forest trees to biodiversity, carbon sequestration, commerce, recreation and ecology, longleaf reforestation efforts are ongoing making use of seedlings grown in resource-intensive nursery operations. Direct seeding is potentially far less expensive and sustainable but protection of the seeds and germinated seedlings in the few weeks after planting is of paramount importance. Also of great importance, any device for reducing predation in direct seeding operations must be highly economical, extremely light weight, capable of rapid deployment, and disappear without requiring retrieval, impairing growth of the desired plant or leaving behind any potentially harmful residual materials.

Various plant protection devices are known but all fail one or more of these critical requirements. For example, U.S. Pat. No. 8,683,741 provides a plant cover or protector is constructed of a translucent or other material, a flexible or bendable material, cut into a two-dimensional blank or shape and provides an easily assembled, self-supporting structure to be placed over one or more plants or a location. See FIG. 1. However, the device is complex, requires assembly and seeks to fully enclose the seed/sapling, requiring further modification after placement to enable the plant to grow and eventual retrieval after deployment.

US Pat. Pub. 20180077878 provides a planter made of a compostable resin with a crown shaped top edge, the mild points of which serve as a deterrent to animals walking on or eating the plant. The planter has slotted sidewalls in the base area that serve as a vent for water flow and for root expansion when directly planted into the ground. See FIG. 2. However, this device is designed for a seedling that has been germinated and requires partial insertion below the surface of the soil, making deployment labor intensive. Further, it has a splayed opening that will allow predation from above by mammals and birds, and requires adjustment after initial deployment to avoid girdling or otherwise limiting plant growth over time.

Other attempts include U.S. Pat. No. 1,704,801 providing a columnar-based plant protector. See FIG. 3. U.S. Pat. No. 1,161,380 provides a plant protector where a material is supported-by a light framework and is positioned about an existing plant to keep away slugs, insects and ground rodents. See FIG. 4. WO 2001054485, a device intended for a previously germinated plant and not a seed, provides a barrier plant protector forming a wall with an undulating ridge that encourage slugs or snails to travel the ridge rather than assaulting the plant. See FIG. 5. U.S. Pat. No. 9,814,188 provides a tree trunk housing adjustable tarp water-saving device, see FIG. 6. U.S. Pat. No. 1,926,053 provides plant protectors to provide a housing for guarding young vines and other plants from pests, such as beetles, rodents and insects, as well as for protecting the plants from being mashed and broken off during cultivation, and protect the plants from the direct rays of the sun or at night from frost. See FIG. 7. Other attempts are shown in nonpatent literature, such as shown by FIG. 8 showing a conical plant protector that must be assembled around the existing plant and FIG. 9 that provides a conical grid structure that protects existing plants against weed eater damage.

Accordingly, it is an object of the present disclosure to provide a device for deterring predation of directly planted seeds and the resulting seedlings from ground crawling creatures, birds and larger mammals that requires no assembly, deploys rapidly, needs no further attention of any sort once in place, allows unimpeded growth of seedlings and any co-habitant plants germinating within the device, repels forest litter and other detritus without reducing rain penetration or excessive shading, is exceptionally low cost and light weight, and melts away without harming the desired seedling or leaving any harmful residue when exposed to prescribed fire in the ordinary course of forest management practices.

Citation or identification of any document in this application is not an admission that such a document is available as prior art to the present disclosure.

SUMMARY

The above objectives are accomplished according to the present disclosure by providing in one embodiment a protective device for seeds and seedlings. The protective device may include a device base defining an open interior perimeter, a perimeter boundary extending from the device base, at least one primary palisade and at least one secondary palisade extending from the perimeter boundary, the at least one primary palisade and the at least one secondary palisade may differ in length with respect to one another, and define at least one chasm between them, the primary palisade and secondary palisade may also define an interior of the protective device; the at least one primary palisade and at least one secondary palisade may each have a sharpened spine truncating in a protective spike; and the at least one primary palisade and at least one secondary palisade may each define an angled ledge that angles the sharpened spine and protective spike inward with respect to the interior of the protective device. Further, at least one score line may be defined into a device body of the protective device. Yet still, the device base may include at least one stake opening. Moreover, the protective device may be biodegradable. Further still, the protective device may be formed to melt when exposed to flame of approximately 200° F. to 800° F. Yet again, two or more primary palisades may be present and form an open end via the distal end of each of the two or more primary palisades angling toward one another. Still yet again, the open end may be enclosed via a plurality of protective spikes forming a perimeter of the open end. Again further, the at least one chasm may form an unobstructed, uncovered opening allowing free flow of air and light into the protective device interior.

In a further embodiment, a method of making a protective device for seeds and seedlings is provided. The method may include forming a device base defining an open interior perimeter; forming a perimeter boundary extending from the device base; forming at least one primary palisade and at least one secondary palisade extending from the perimeter boundary; defining at least one chasm between the at least one primary palisade and the at least one secondary palisade defining an interior of the protective device; forming the at least one primary palisade and at least one secondary palisade to each define a sharpened spine truncating in a protective spike; and forming the at least one primary palisade and at least one secondary palisade to each define an angled ledge that angles the sharpened spine and protective spike angle inward with respect to the interior of the protective device. Further, at least one score line may be defined into a device body of the protective device. Yet still, the device base defines at least one stake opening. Still, the protective device may be formed to be biodegradable. Again further, the protective device may be formed to melt when exposed to flame of approximately 200° F. to 800° F. Even further, two or more primary palisades may form an open end via a distal end of each of the two or more primary palisades angling toward one another. Further again, the open end may be enclosed via a plurality of protective spikes forming a perimeter of the open end.

In a still further embodiment, a method for protecting a seed or seedling is provided. The method may include placing a protective device above a section of ground containing at least one seed or seedling, wherein the protective device includes a device base defining an open interior perimeter, a perimeter boundary extending from the device base, at least one primary palisade and at least one secondary palisade extending from the perimeter boundary and defining at least one chasm between the at least one primary palisade and the at least one secondary palisade defining an interior of the protective device, the at least one primary palisade and at least one secondary palisade each defining a sharpened spine truncating in a protective spike; and the at least one primary palisade and at least one secondary palisade each defining an angled ledge which causes sharpened spine and protective spike to angle inward with respect to the interior of the protective device. Further, the method may include staking the protective device to the section of ground containing at least one seed or seeding. Even further, the method may include forming the protective device to be biodegradable. Further yet, the method may include forming the protective device to melt when exposed to flame of approximately 200° F. to 800° F. Further still, the method may include forming the open end enclosed via a plurality of protective spikes forming a perimeter of the open end. Utilization of these and other embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

Figure 1:
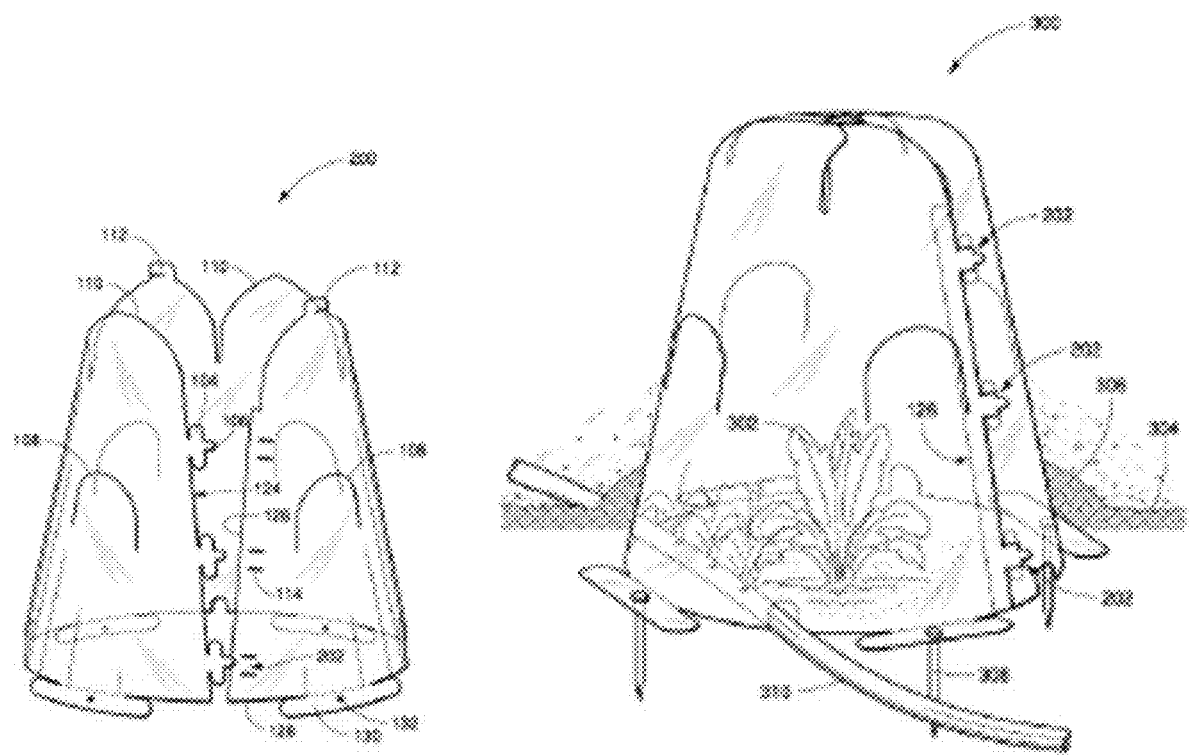
FIG. 1 shows a Prior Art construct.
Figure 2:
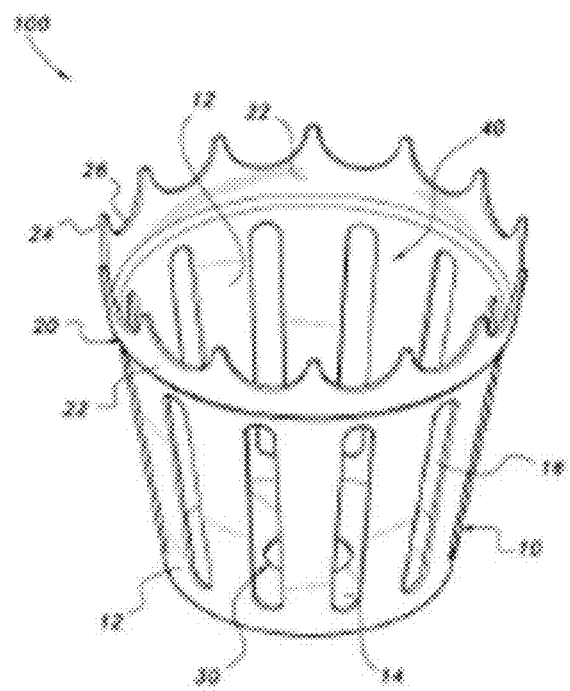
FIG. 2 shows another Prior Art construct.
Figure 3:
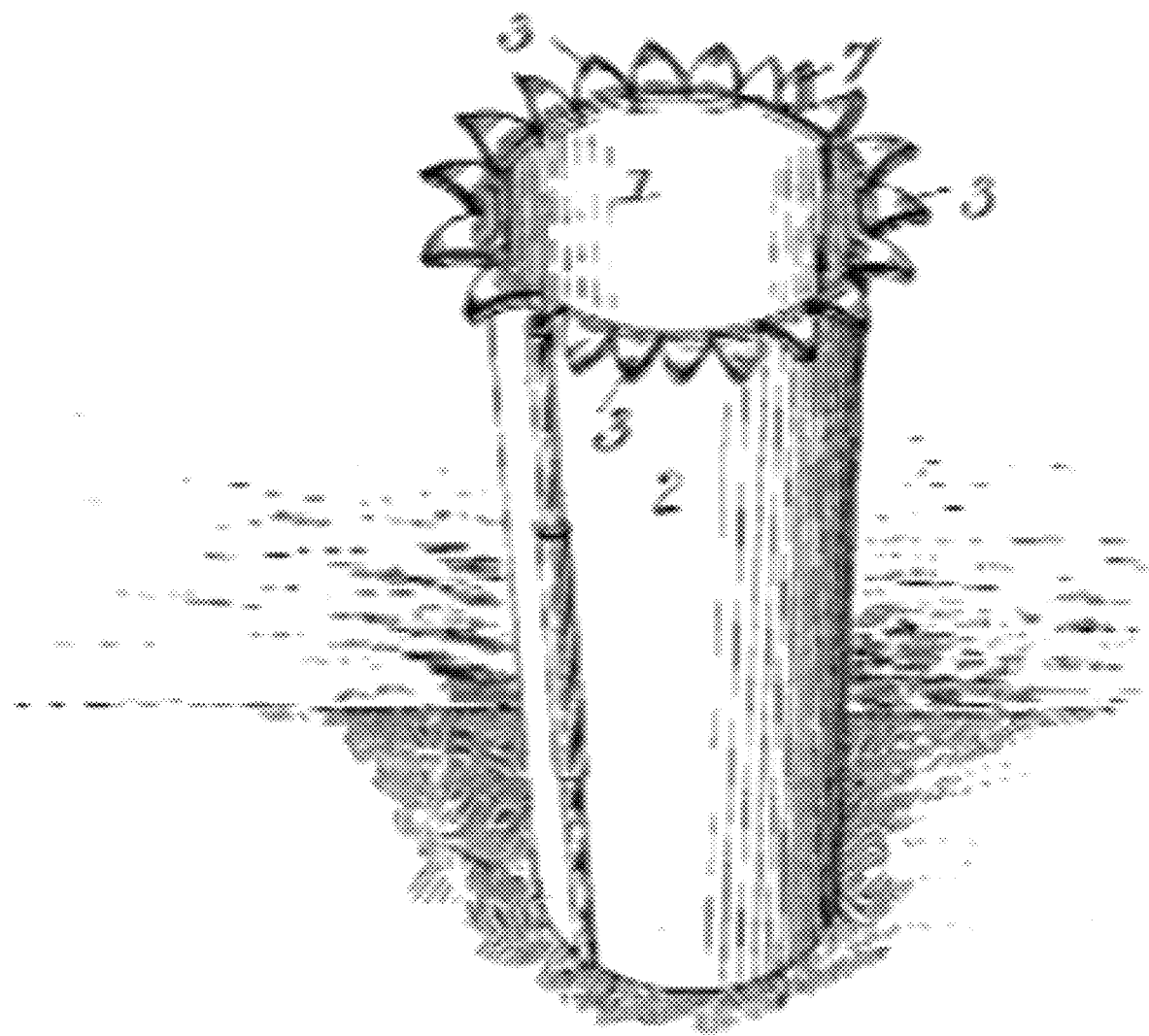
FIG. 3 shows yet another Prior Art construct.
Figure 4:
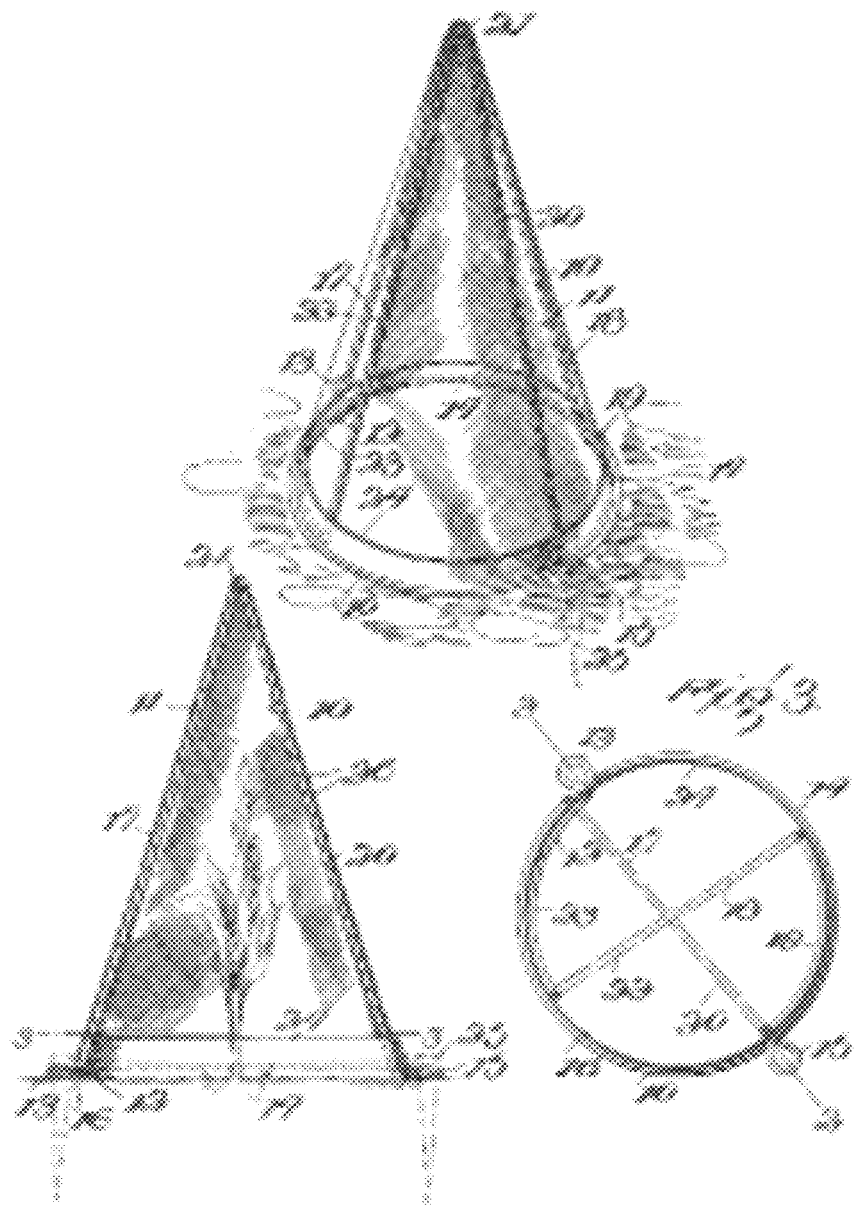
FIG. 4 shows a further Prior Art construct.
Figure 5:
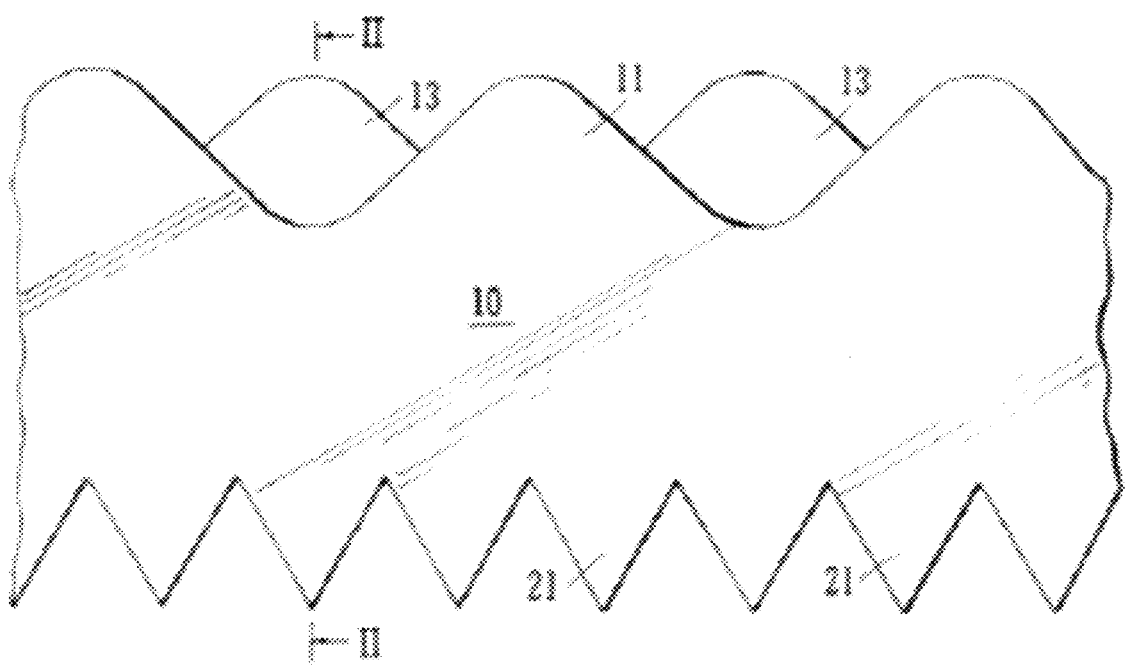
FIG. 5 also shows a Prior Art construct.
Figure 6:
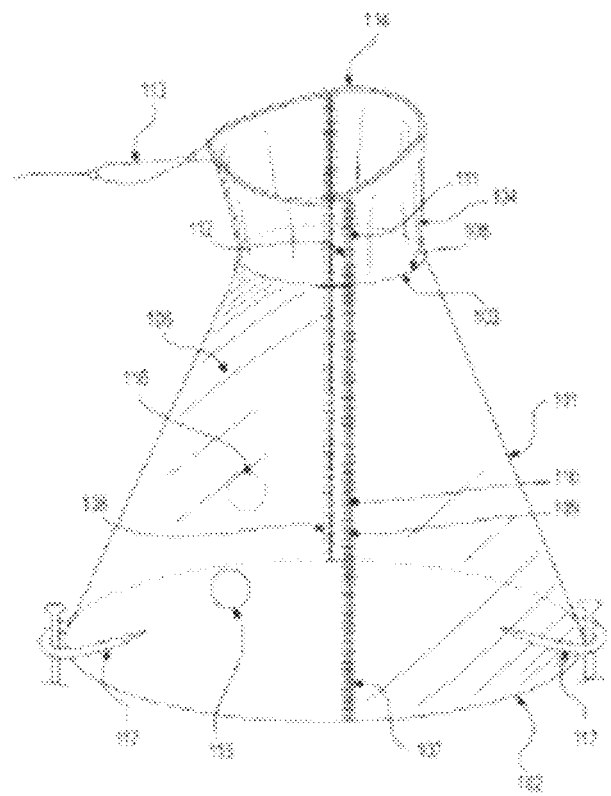
FIG. 6 shows another Prior Art construct.
Figure 7:
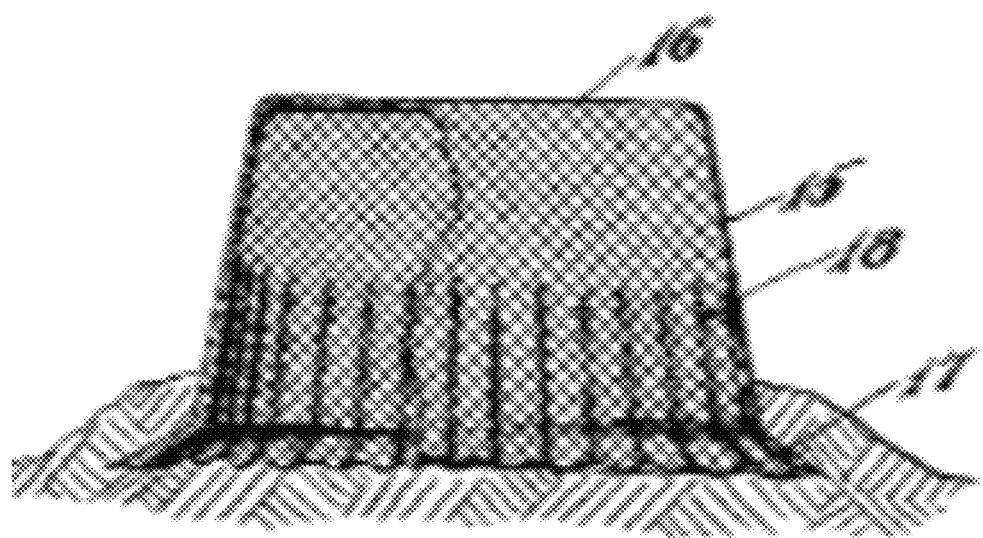
FIG. 7 shows still another Prior Art device.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the devices described herein can be presented as a combination kit. As used herein, the terms "combination kit" or "kit of parts" refers to the devices and any additional components that are used to package, sell, market, deliver, and/or deploy the device therein. Such additional components include, but are not limited to, packaging, blister packages, nutrients, growth media, stakes, seed tapes, and the like. The separate kit components can be contained in a single package or in separate packages within the kit.

In some embodiments, the combination kit also includes instructions printed on or otherwise contained in a tangible medium of expression. The instructions can provide information regarding the content of the compounds and/or formulations, safety information regarding the device contained therein. In some embodiments, the instructions can provide directions and protocols for using the device. In some embodiments, the instructions can provide one or more embodiments of the methods for deploying and using the device such as any of the methods described in greater detail elsewhere herein.

The inventor of the device described herein, known as a SEED CROWN™ is a landowner in a portion of the Longleaf region where planting nursery-grown seedlings for reforestation purposes is not a good fit. In additional to the prohibitive costs of nursery stock, the inventor's property sits in a comparatively isolated, higher elevation montane longleaf region. Consequently, one of the goals of the current disclosure is to aid in efforts to preserve whatever genetic adaptations might exist among local trees near a given planting site. The progeny of nursery-grown seedlings is both limited and often uncertain. As a result, great amounts of time have been spent determining how to get from having a longleaf seed in a tree to having a longleaf seedling prospering in a desired location on the forest floor with the least possible inputs in between. This disclosure affords a vast reduction in the total inputs necessary to establish a viable longleaf tree in a forest setting and, therefore, represents a much more sustainable method for meeting conservation objectives.

Experimentation for the current disclosure includes both growing seedlings for transplant and direct seeding, all from locally sourced seeds. These attempts confirm the intensity of predation longleaf seeds and young seedlings face. Through trial and error, however, the inventor discovered the period of greatest predation risk is quite brief. Observations suggest that predation loss begins to decline just a few weeks after germination and becomes almost rare in less than 12 weeks. Further, even modest amounts of predator deterrence can tip the balance in favor of seedling survival.

Indeed, the inventor's experiments have shown that covering a well-planted seed with a simple upside-down plastic strawberry basket will produce germination and three-month survival rates exceeding 50%. It takes no great amount of imagination or experience to recognize that simply sticking a seed in the ground and covering it with a little basket compares favorably in terms of total inputs with the more conventional method of starting a seedling in a nursery and then transplanting it to a forest location, especially if survival rates are at least on the same order of magnitude. Further, a viable direct seeding method would make it practical for individual landowners able to collect even a few ripe cones to regenerate Longleaf on their own property, thereby greatly expanding—indeed democratizing—the conservation effort.

The problem with anything like a strawberry basket, however, is that it quickly clogs with other vegetation and, even if it remains free of competition, it would eventually impede growth of the desired seedling if left in place for more than a few weeks as the plant and cohabitant vegetation grow. As such, the baskets (or almost all of the other devices discussed in the prior art section) need to be revisited and eventually retrieved, at least doubling the labor requirement. Interestingly, efforts were made several decades ago to use biodegradable, compound-part seed shelters in Canada's boreal forests for regenerating different conifer species, but vegetative fouling, the expense of the plastics chosen, complexity of the devices, and labor requirements resulted in the efforts being abandoned.

After trying a number of variations on basket-like coverings to thwart predation, the inventor's breakthrough solution was to cut the bottom half from drink cups made of cornstarch plastic (i.e., biodegradable materials such as polyactic acid or "PLA") in a pattern that leaves protruding spikes or palisades that are taller than the opening circumference. Turned upside down, the solid plastic side thwarts or at least deters small mammals, birds and ground-crawling insects, and the palisade points are enough to deter larger animals like deer and rabbit because it is difficult or not possible to reach the seed or seedling through the top opening without encountering the points. A second breakthrough was to heat formed the pointed palisades to curve inward so as to narrow the top opening, thereby making a predator's access from above even less appealing and, equally as important, helping to deflect leaf litter falling in the forest (which can be a problem with completely open topped guard designs), all while remaining flexible enough not to impair seedling growth or become fouled by co-habitant vegetation growing alongside the desired seedling.

A third critical breakthrough was to recognize that, while the PLA would eventually biodegrade on its own, the material begins to melt at ~200° F. Typical prescribed fire temperatures in the southeastern United States typically peek around 800° F. (See Kennard, et al., Fire Ecology 1, 75-84 (2005).) Thus, the PLA employed for the current devices will melt between the preferred prescribed fire range of approximately 200° F. to 800° F. Therefore, devices made from PLA or similar biodegradable plastics readily vanish when exposed to prescribed fire, essential forest management tool for Longleaf and may other fire-adapted species. Another important feature of PLA is that it is the least expensive of the plant-based plastics. In order to be a viable alternative to nursery-grown seedlings on a large scale, any aid for direct seeding must have very low manufacturing costs. It should be possible to manufacture SEED CROWN™ using thermoforming from PLA plastic sheets in the same fashion as dome-shaped lids used for drinking cups on a large scale at a cost of a few pennies per unit. It should likewise be possible to make mesh or basket versions from PLA or other biodegradable material that are economically viable.

Turning to a description of the ergonomic process of planting a Longleaf seed with a SEED CROWN™, full deployment involves approximately six steps: (1) from a standing position, scrape away surface litter with a boot toe to create a clear spot on the ground slightly larger than a SEED CROWN™; (2) using one hand holding two staking skewers, probe the ground to a depth of about a half-inch to loosen soil and check for near-surface impediments like roots or rocks; (3) insert one or more Longleaf seeds (point down/wing up) in the soil so that approximately ¾ of the seed is below surface; (4) if necessary (and available), apply light watering to secure the seeds; (5) place a SEED CROWN™ over the seed or seeds so the planting site is centered; and (6) secure the SEED CROWN™ to the ground using two pegs or skewers inserted through the holes (or through the mesh of the basket version).

The inventor has obtained the best results planting between October 1 and March 31, but Longleaf can be successfully planted under a SEED CROWN™ anytime soil moisture remains adequate for germination and survival. Draught is always a peril for any seedling (especially in the first year), and a severe freeze within a few weeks of germination can also result in significant mortality, so planting in October and November are optimal. For planting at the scale of hundreds or thousands, it may be useful to have a large-wheel "game cart" or even an ATV with a several-gallon water jug (equipped with a spray nozzle) and a holder for SEED CROWN™ devices, as well as a nail apron for skewers and seeds. For rugged terrain, a planting kit could be assembled in a standing backpack (similar to a golf bag) for transport to the target location and relatively easy movement between specific planting spots.

With regard to the need for watering, the ideal conditions for carefully planting seeds are during a light rain or shortly after rain so that the seeds "stick" to wet soil particles and, therefore, remain in the desired position even if it rains again before the radical root hairs emerge. Under those ideal conditions, watering is not necessary. If the surface soil is dry, however, germination rates can be materially improved by applying a small amount of water (less than 0.5 oz.) to help secure the seed in place. Planters in the field can obtain the same result applying the light watering after the SEED CROWN™ is in place, meaning dozens or even hundreds of seeds can be fully planted under a corresponding number of SEED CROWN™ devices and then followed in sequence by light watering of a larger cohort, an approach that improves efficiency in most settings.

A SEED CROWN™ can be left in place after planting even though its work will be done in about six to ten weeks (meaning the seedlings will have reached the point where predation is no longer a significant peril). Depending on temperature and sunlight falling on the micro-site, a SEED CROWN™ will begin fracturing apart in the first year of deployment. However, major portions or even intact SEED CROWN™ devices will persist until the first prescribed burn, which will melt the PLA plastic. Whether decomposition occurs with or without fire, the PLA remains non-toxic.

Figure 10:
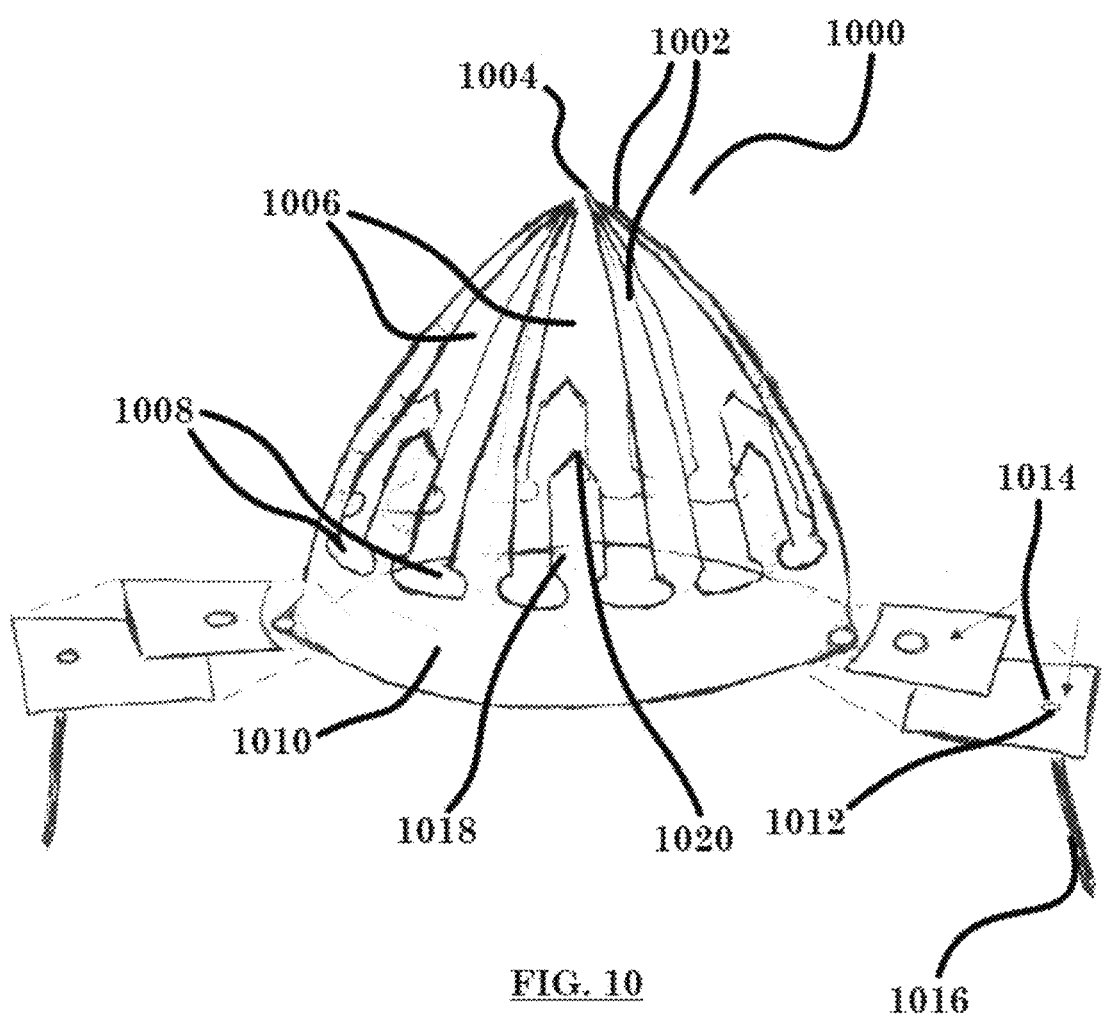
FIG. 10 shows one embodiment of a device of the present disclosure.

FIG. 10 shows one embodiment of a seed/sapling protection device 1000. Device 1000 may include primary palisades 1002, which may be separated from one another by less than 0.5", 1.0", 1.5", 2.0", 2.5", etc., which curve towards the top opening to deflect leaf litter while allowing unimpeded growth of the seedling. Palisades 1002 may also protect from predation from omnivores and herbivores by having sharpened points 1004. The length of the primary palisades 1002 is greater than the radius of the bottom opening, a ratio that results in the bending palisade shielding the seed or seedling when pressed downward by the snout of a predator, and which also results in discouraging engagement with the opposing points. Also gaps 1006 may be formed between palisades. Gaps 1006 may allow fascicle needles, stems, shoots, etc., to protrude from device 1000, instead of hampering or preventing same as seen in past attempts. The gaps 1006 may end in crescent transitions 1008 where they meet the body 1010 of the device 1000 to divert water flowing down the palisades inward towards the seed or seedling, to provide a gentle point of engagement for protruding plant members such as needles, stems, buds, etc., and to increase flexibility of the primary palisades 1002 and eventual decomposition the entire device 1000, whether by melting or biodegradation. Device 1000 may also have anchor tabs 1012 that define anchor holes 1014 within anchor 1012 to accommodate pegs 1016 that may be pressed into the ground to secure device 1000. Device 1000 may also form secondary palisades 1018 between primary palisades 1002 to increase ventilation and rain ingress while also serving to deter predation via sharpened points 1020. Device 1000 may also have vertical scoring or breakpoints along the solid base to enhance fracturing over time.

Figure 11:
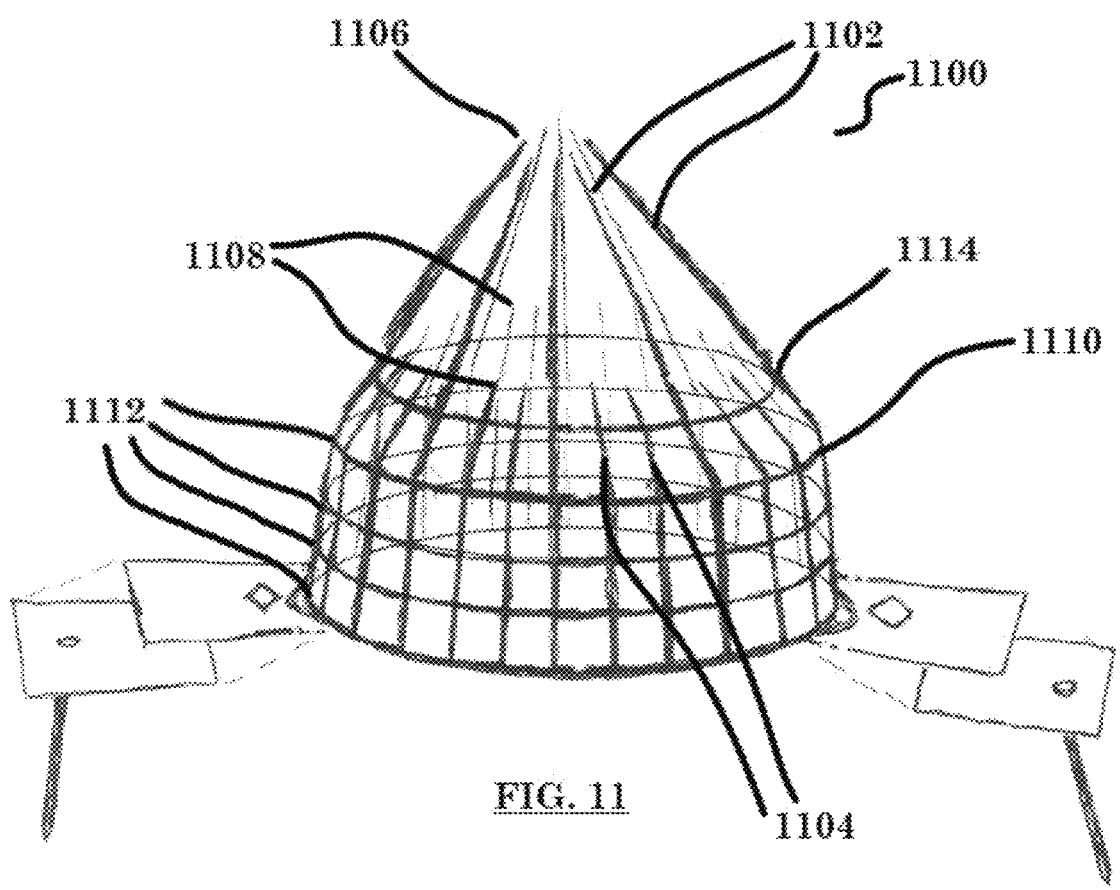
FIG. 11 shows an alternative embodiment of a device of the present disclosure.

FIG. 11 shows an alternative embodiment of a SEED CROWN™ of the current disclosure. In this embodiment, seedling protection device 1100 has a mesh or basket weave body 1110 and primary palisades 1102 and secondary palisades 1108 formed of ribs protruding above the top ring of the mesh or woven body 1110. By making the top-most ring 1114 of the mesh narrower than the other rings 1112, the flexible primary palisades 1102 and secondary palisades 1108 tilt inward. The length of the primary palisades 1102 is greater than the radius of the bottom opening, a ratio that results in the bending palisade shielding the seed or seedling when pressed downward by the snout of a predator, and which also results in discouraging engagement with the opposing points. The rings 1112 forming the horizontal members of the mesh or weave body 1110 may be crimped to accelerate decomposition whether when melting by fire or slower biodegradation. The more "open air" structure to the seedling protection device 1100 may allow greater ventilation and rain infiltration and less greenhouse effect as compared to embodiment 1000 in FIG. 10, making device 1100 potentially preferable for comparatively hotter or drier conditions.

Figure 12A:
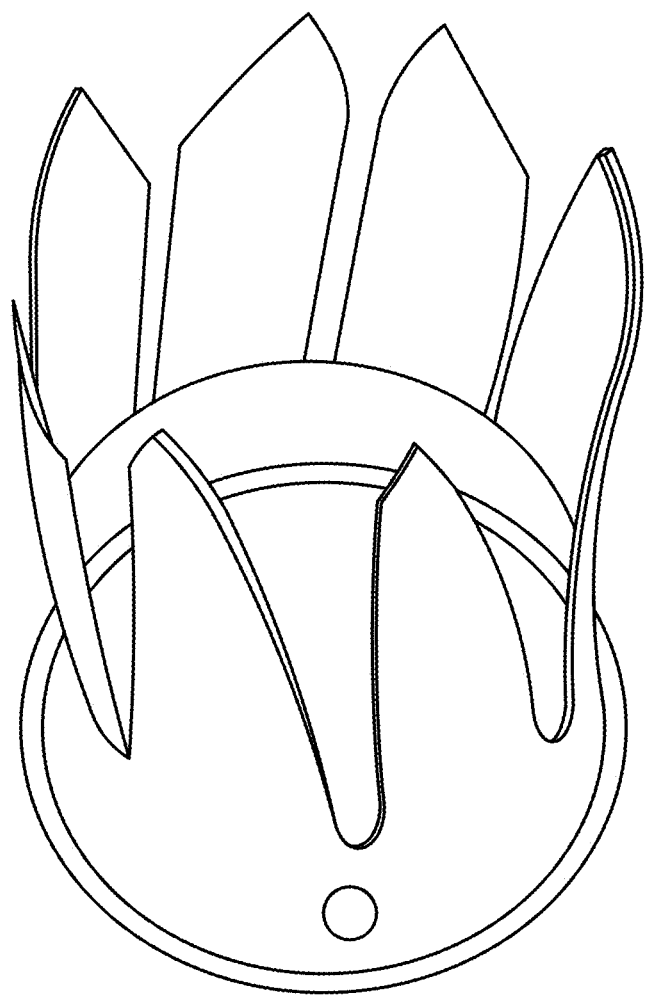
FIG. 12A shows a picture of one embodiment of the current disclosure lacking secondary palisades.
Figure 12B:
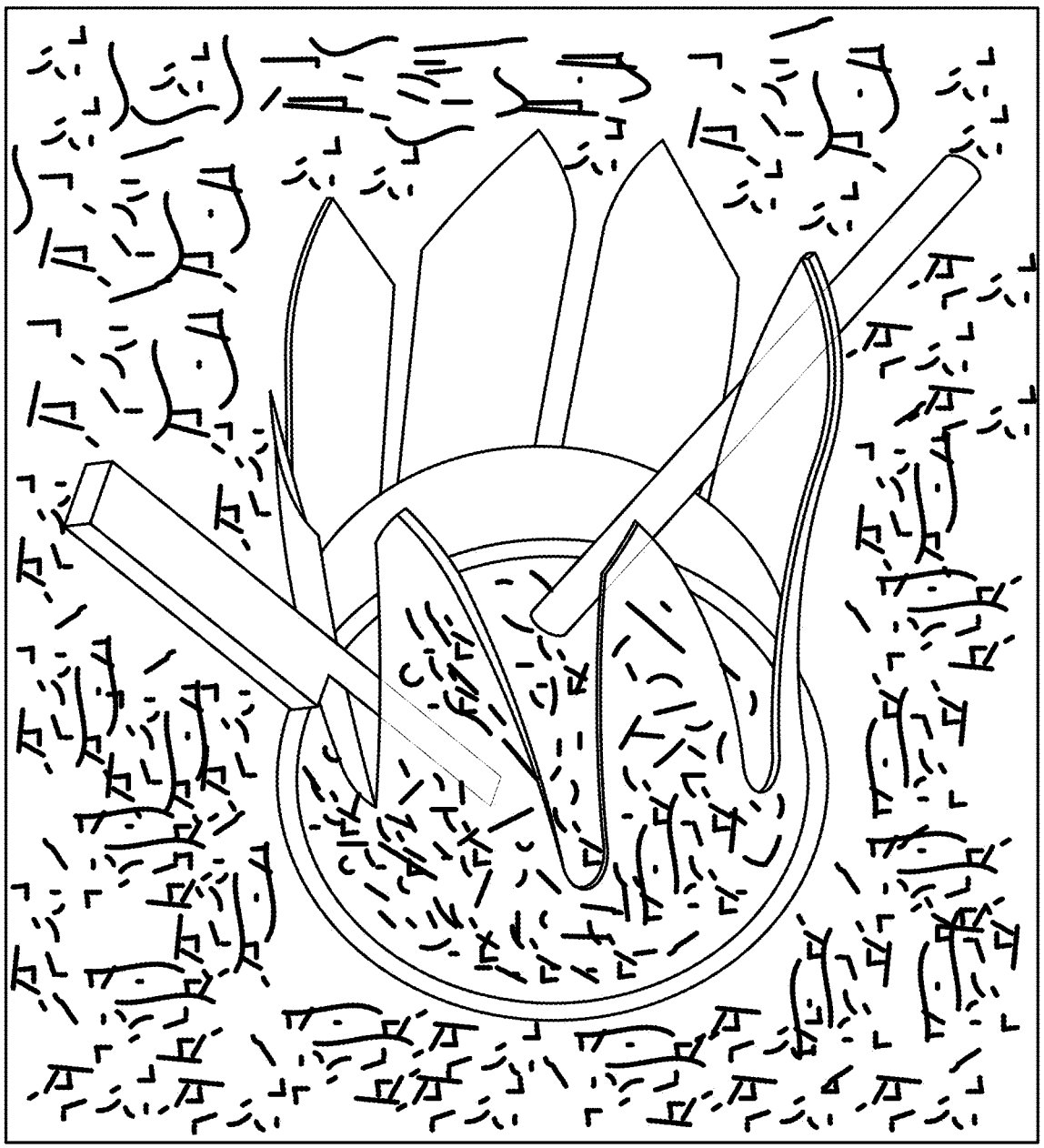
FIG. 12B shows the device of FIG. 12A placed over a seedling.
Figure 12C:
FIG. 12C shows the device of FIG. 12A after the seedling has increased in size.

FIG. 12A shows a picture of one embodiment of a SEED CROWN™ of the current disclosure with straight primary palisades and lacking secondary palisades. Note that the length of the primary palisades in this embodiment is greater than the diameter of the opening, a ratio that makes it difficult to reach the seed or seedling without encountering the palisade points. This embodiment may be preferred where falling leaf litter or other detritus is not a concern, such as an "old field" planting site. FIG. 12B shows the device of FIG. 12A placed over a seedling. FIG. 12C shows the device of FIG. 12A after the seedling has increased in size, demonstrating both the protective effects and benefits provided by a SEED CROWN™.

Figure 13:
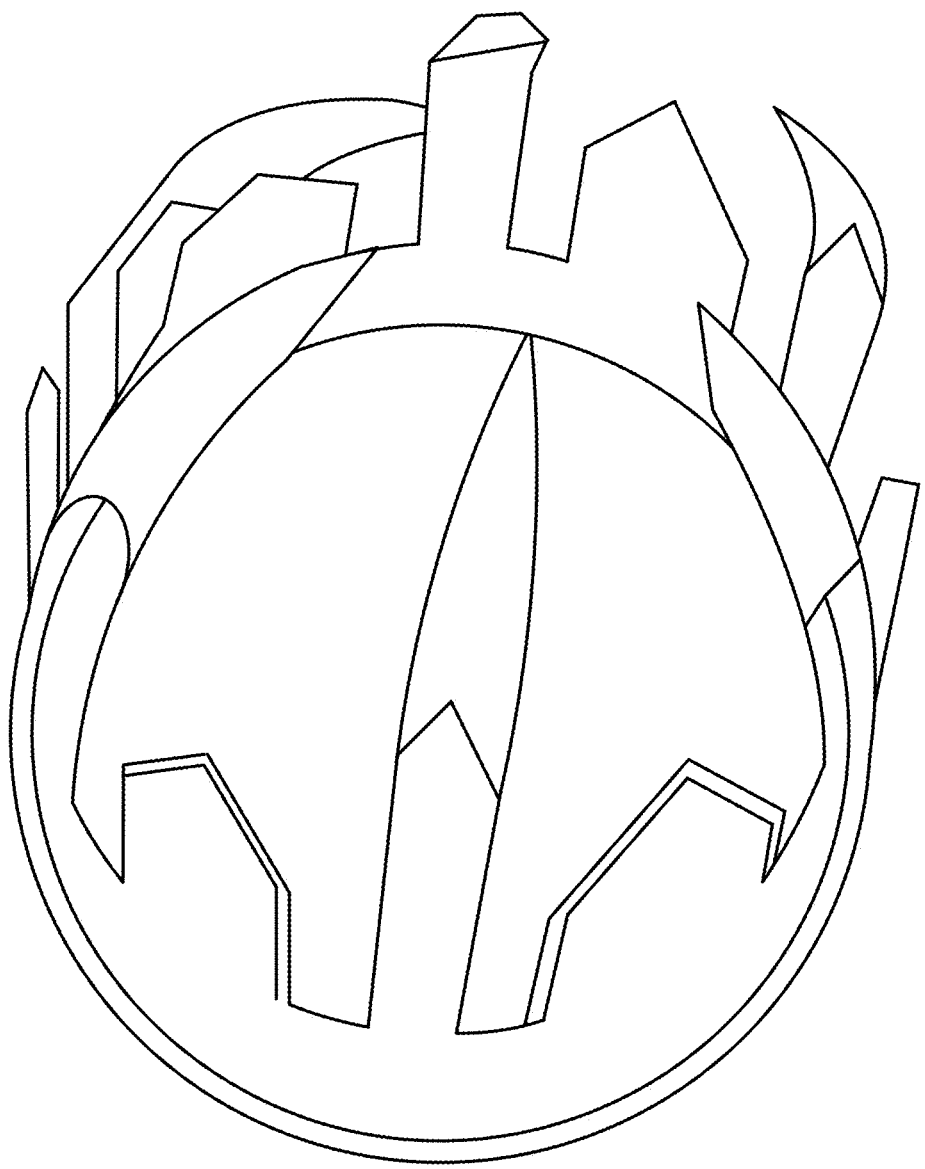
FIG. 13 shows an embodiment of the current disclosure showing distinctive coloration applied to the device.

FIG. 13 shows an embodiment of a SEED CROWN™ of FIG. 10 with curved and pointed primary palisades and pointed secondary palisades, and with coloration applied to the transparent material to make the device easier to observe.

Figure 14:
FIG. 14 shows a deployed device of the current disclosure surrounding a longleaf seedling.

FIG. 14 shows a deployed SEED CROWN™ with curved and pointed primary palisades and pointed secondary palisades, and with coloration applied to the transparent material to make the device easier to observe, protecting a recently germinated seedling.

Figure 15:
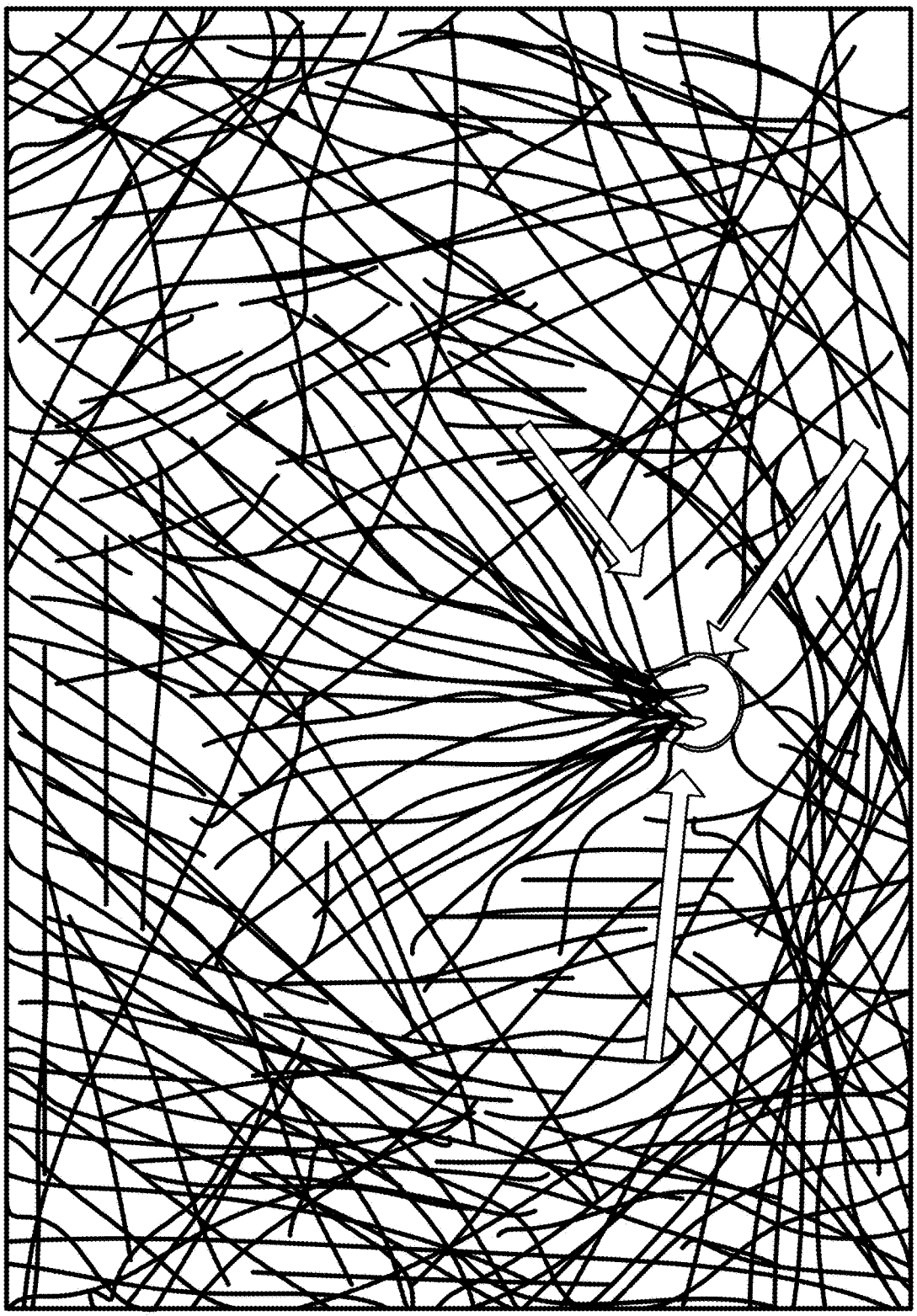
FIG. 15 shows the device of FIG. 14 after the longleaf seedling has grown through the device as it matures.

FIG. 15 shows a 1.5 year-old seedling with a deployed SEED CROWN™ that has curved and pointed primary palisades and pointed secondary palisades, and with coloration applied to the transparent material to make the device easier to observe. The older seedling's needles protrude unimpeded through the side gaps and top opening.

Figure 16:
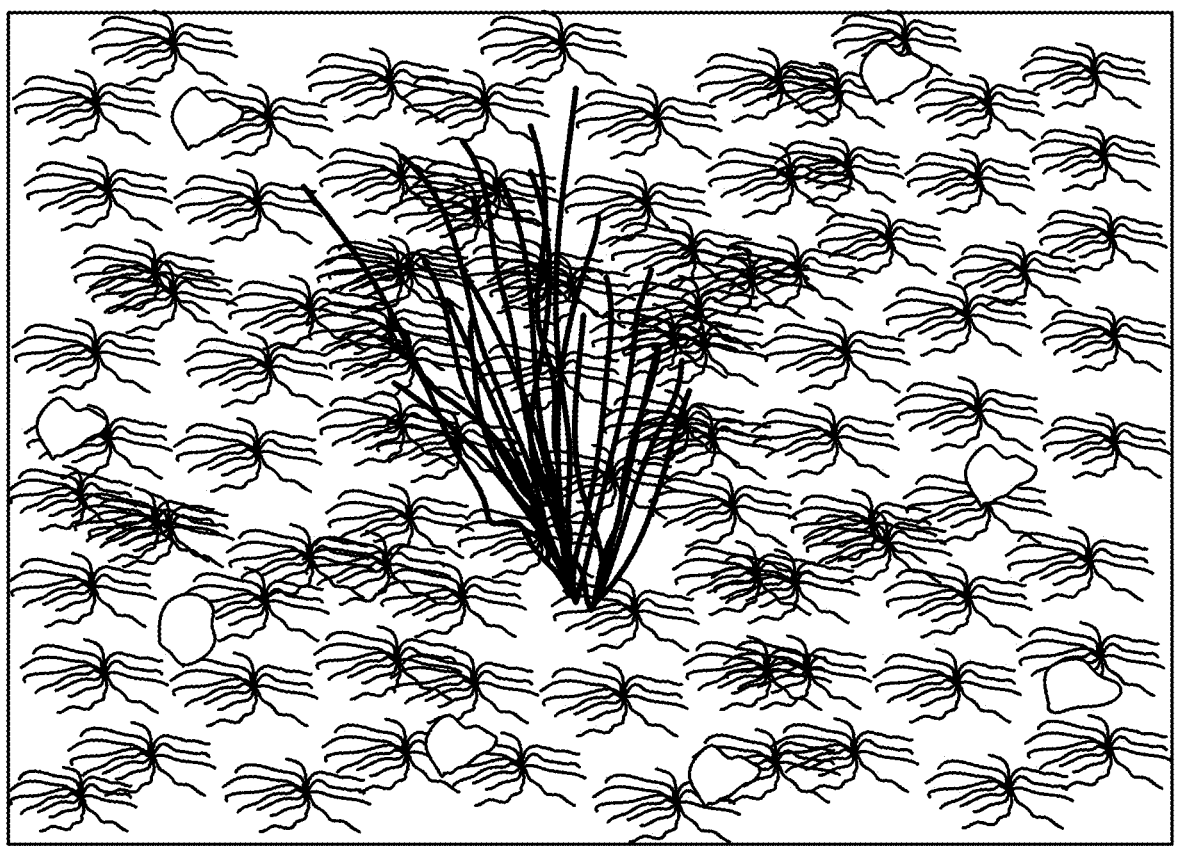
FIG. 16 shows the view of FIG. 15 after a controlled burn has occurred.

FIG. 16 shows the same seedling shown in FIG. 15 approximately five minutes after a controlled burn has occurred. This figure shows that the SEED CROWN™ has been eliminated completely and no residue remains behind, leaving the seedling to grow and mature.

Figure 17:
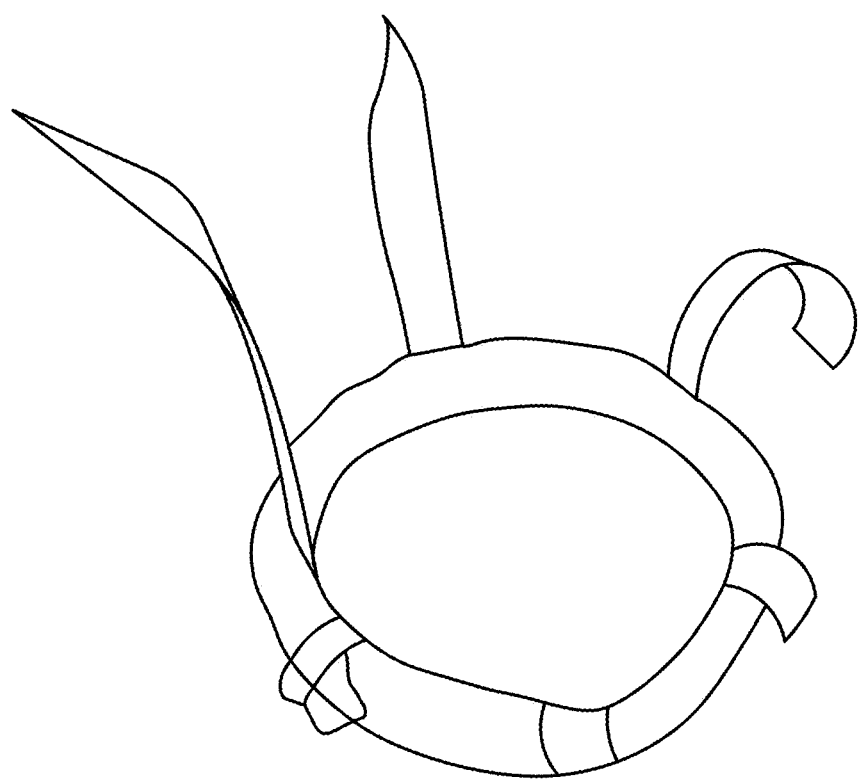
FIG. 17 shows an additional feature whereby the SEED CROWN™ palisades curl outward when exposed to low-level heat.

FIG. 17 shows an additional feature whereby the SEED CROWN™ palisades curl outward when exposed to low level heat over time, such as direct summer sun, further reducing the extent to which the device might impede growth of seedlings or cohabitant vegetation.

In addition to the embodiments disclosed and described herein in which a SEED CROWN™ may be made in one piece from polyactive acid plastic, in other embodiments SEED CROWN™ devices may be made from other biodegradable materials such as, but not limited to, starch blends, cellulose-based plastics, lignin-based polymer composites, polyglycolic acid (PGA), polybutylene succinate (PBS), polycaprolactone (PCL), polybutylene adipate terephthalate (PBAT), poly (vinyl alcohol) (PVA, PVOH) etc. Additional embodiments can be made from petroleum-based plastics where reuse of individual SEED CROWN™ devices is desirable, such as in research settings, just as an example. However, the current disclosure is not limited to just plastics and extends to other biodegradable materials such as bamboo, Tipa bio-plastic polymers, mycelium, hemp, jute, other woods, Areca palm leaf, Avocado bio-plastic, etc. Biodegradability may be defined per ASTM D5208, D6400, D5338, D6691, and/or D7991.

In a further embodiment, the material forming the SEED CROWN™ may have the approximate thickness and weight of a drink cup or, in the basket or mesh embodiment, of a plastic strawberry basket, simplifying handling of large quantities in the field.

Further, a SEED CROWN™ may be transparent for better sunlight transmission or distinctly colored, such as blaze or neon colors, to allow for easier location of the SEED CROWN™ once deployed (a feature that may be helpful in maintaining desired planting densities and also in research settings).

Figure 8:
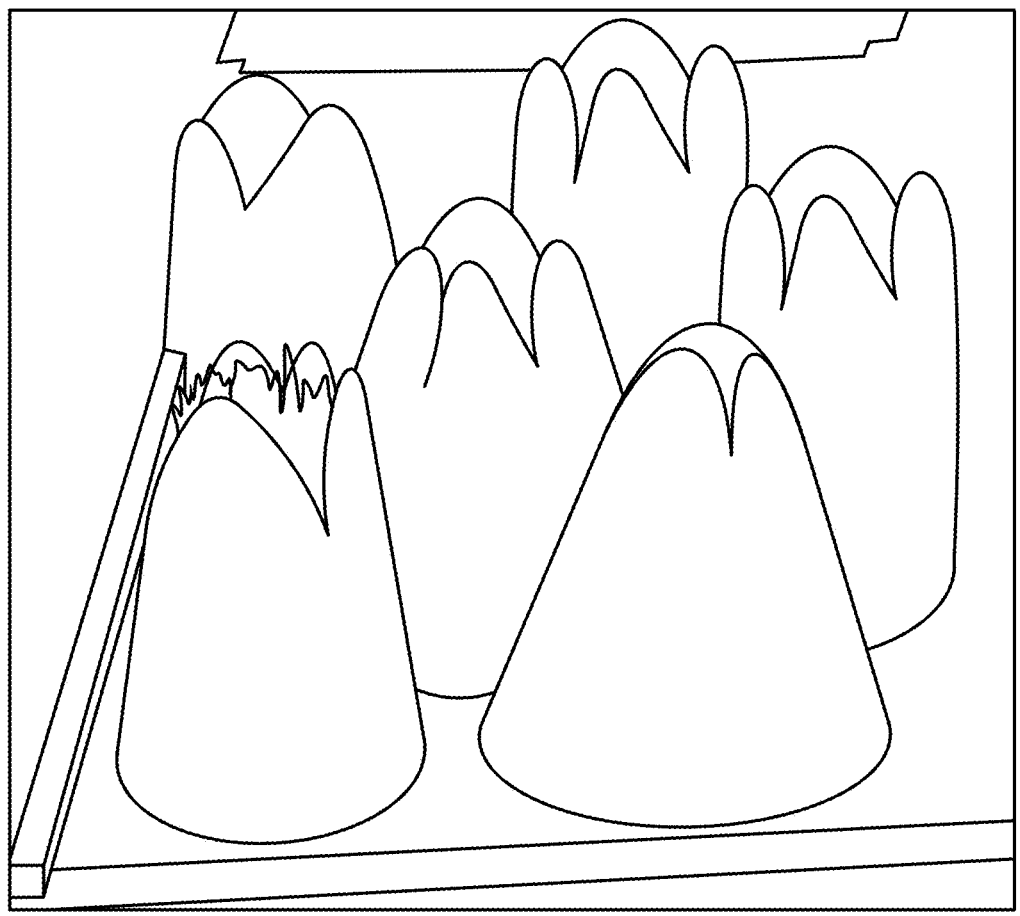
FIG. 8 shows a nonpatent literature device.
Figure 9:
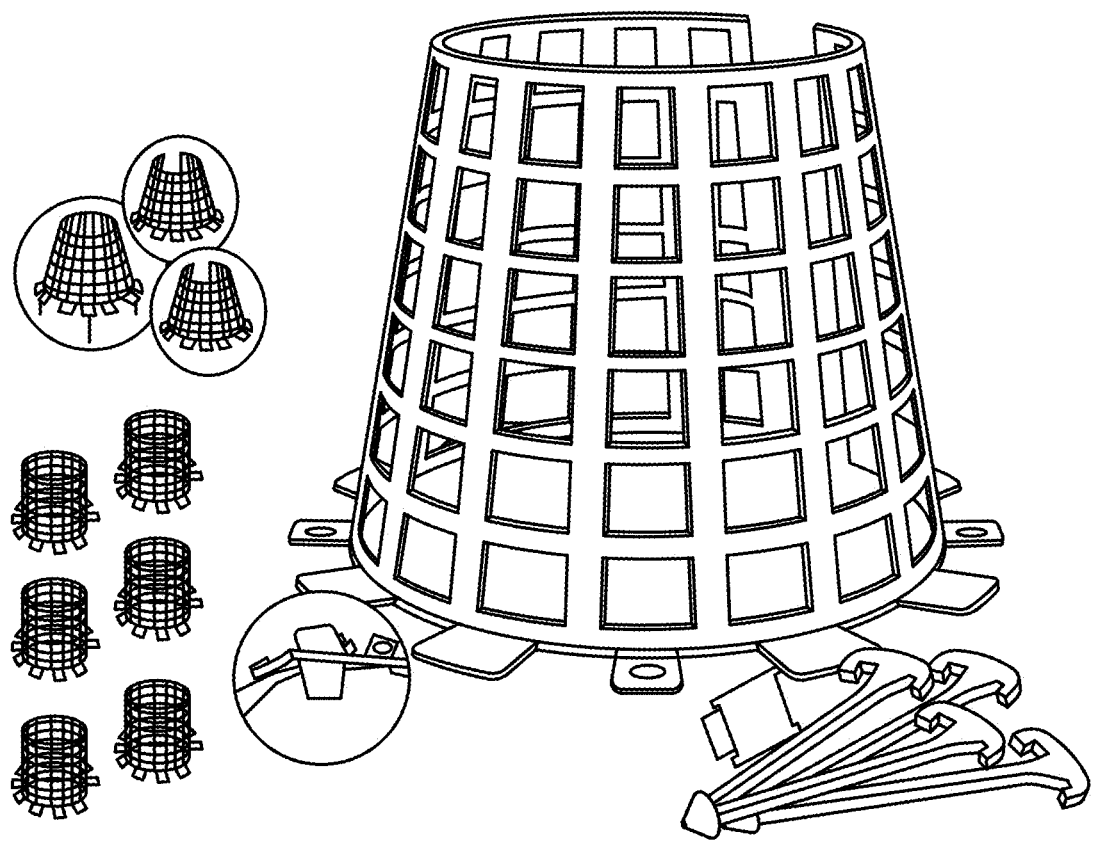
FIG. 9 shows a further nonpatent literature device.
Figure 18:
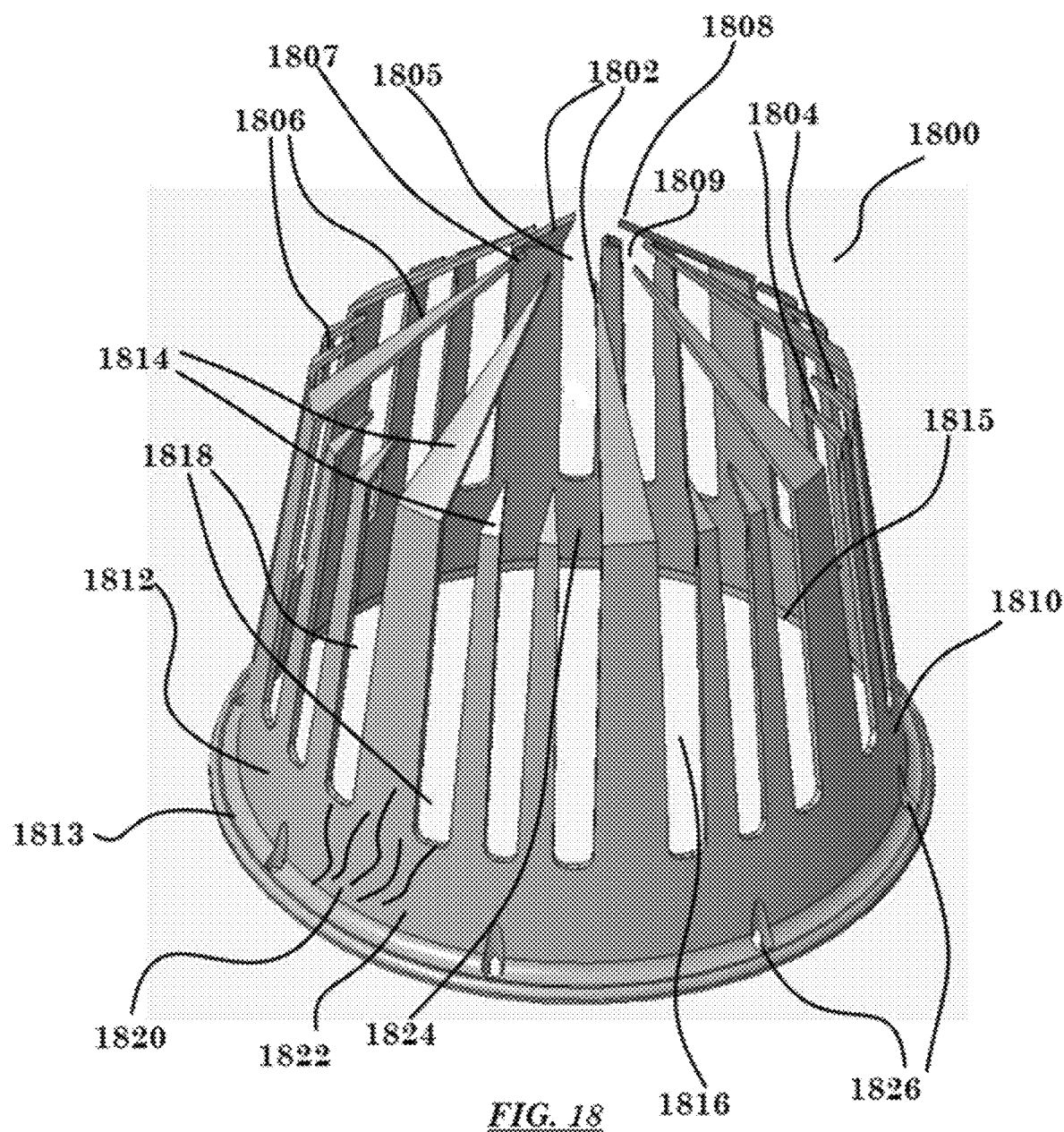
FIG. 18 shows a further embodiment of a protective device of the current disclosure.

FIG. 18 shows a further embodiment of a protective device 1800 of the current disclosure. Device 1800 may include primary palisades 1802 and secondary palisades 1804. Device 1800 demonstrates a pattern of two secondary palisades 1804 for each primary palisade 1802, with the length of the primary palisades resulting in a gap between opposing palisade points of less than one inch and the length of the secondary palisades being slightly greater than the radius of the perimeter boundary 1812, thereby being sufficient for litter deflection while minimizing shade and shedding of rainfall The secondary palisades 1804 bend inward on the same plane as the primary palisades to limit snagging leaf litter, with pointed tips present to deter predation. While shown as arranged in a circular format, the current disclosure is not so limited and perimeter boundary 1812 may be shaped in circular, oblong, parallelogram, polygon, and/or other/random shapes optimized for the number or geometrical pattern of seeds planted or plant species to be protected. By way of illustrative examples, and not to be considered limiting, a "figure 8" or "snowman" shape would optimize for planting two grouping of seeds or seedlings beneath a single SEED CROWN™. While a roughly 4" diameter perimeter boundary 1812 for a SEED CROWN™ appears optimized for longleaf, an 8" to 12" diameter perimeter boundary 1812 might be better suited for species with taller seedling morphologies like ponderosa pine or deciduous trees. Further, primary palisades 1802 extend above and beyond secondary palisades 1804 and form open end 1805 via primary palisades 1802 angling toward one another's distal ends 1807. Secondary palisades 1804 may also be oriented with their respective distal ends 1807 angled upward and toward open end 1805. Both types of palisades include elongated and sharpened spines 1806 truncating in protective spikes 1808, by having spines 1806 narrow and taper as they extend, forming a protective spike ring perimeter 1809 around and enclosing open end 1805; the spines on primary palisades 1802 are longer than those of secondary palisades 1804. Further, both primary palisade 1802 and secondary palisades 1804 define inward angled ledges 1814, which angle inward toward protective device interior 1816 to prevent ingress into protective device interior 1816. The inside angle of the intersection of the line running along the palisades rising from the base and the ground surface will ideally be slightly under vertical (i.e., approximately 80°) and the inside angle formed by the intersection of a line projecting along the plane of the ledge 1814 and the ground surface will be approximately 45°. Primary palisades 1802 and secondary palisades 1804 are defined in protective device body 1810 and extend from perimeter boundary 1812, which extends from protective device base 1813, device base 1813 may be formed as open-ended interior perimeter 1815 to allow for unobstructed placement over a seed or seedling, the various palisades are separated by defined chasms 1818 that serve to allow sunlight and oxygen to reach protective device interior 1816. The side wall spacing of primary palisades 1802 and secondary palisades 1804 ideally results in a ratio of openings or chasms 1818 to palisades of approximately 50%. (I.e., there will be approximately twice as much area covered by the palisades as compared to the area exposed via chasms 1818.) Chasms 1818 while shown as defined slots in protective device body 1810 are not limited in shape and can be open-ended slots, closed parallelograms or polygons, open or closed bodied irregular and/or random shapes and are not limited to just the design shown in FIG. 18. Chasms 1818 may be open to the air and unobstructed and uncovered to allow air, rain, light, etc., to enter device interior 1816 unimpeded. This also lowers protection costs and material waste. In one embodiment, chasms 1818 may be open ended slots to reduce material usage when forming protective device 1800, as well as to allow oxygen and light to access device interior 1816. In one embodiment, the chasms between palisades are vertically unobstructed from the point the palisades rise from perimeter boundary 1812 of the device. Device protective body 1810 may also define scoring or score line(s) 1820 into outer surface 1822 of protective device 1800. Scoring 1820 may extend partially into outer surface 1822 or may extend completely through protective device 1800 and exit interior surface 1824 into device interior 1816, defining further openings, not shown, into protective device 1800. Scoring 1820 may also extend along palisades 1802 and 1804. Protective device base 1813 may also define stake openings 1826, which allow stakes to be driven through protective device 1800 to secure it into the ground surrounding a seed or seedling.

Figure 19:
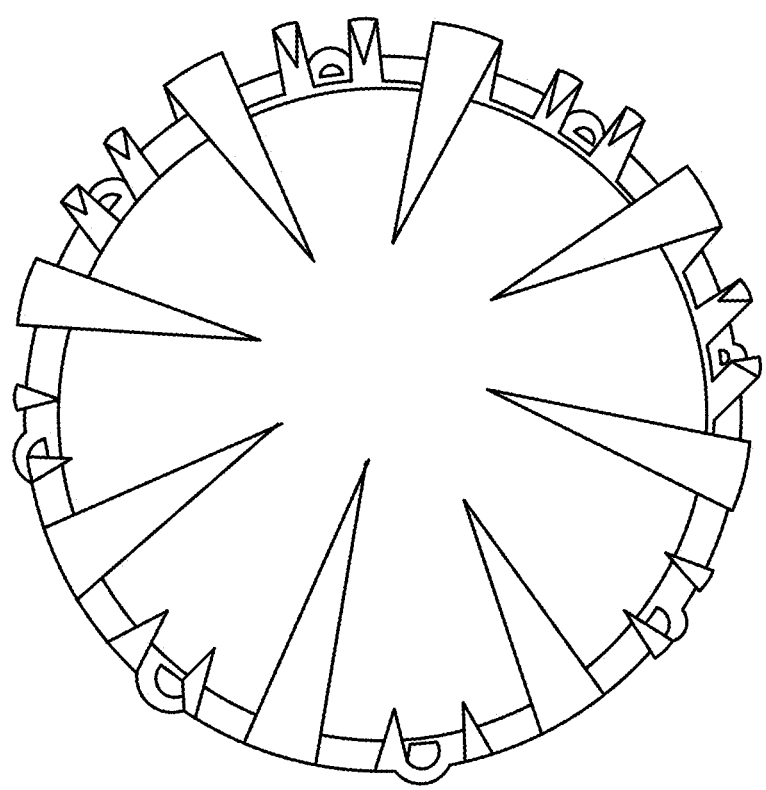
FIG. 19 shows a photo of a downward view of the embodiment shown in FIG. 18.
Figure 20:
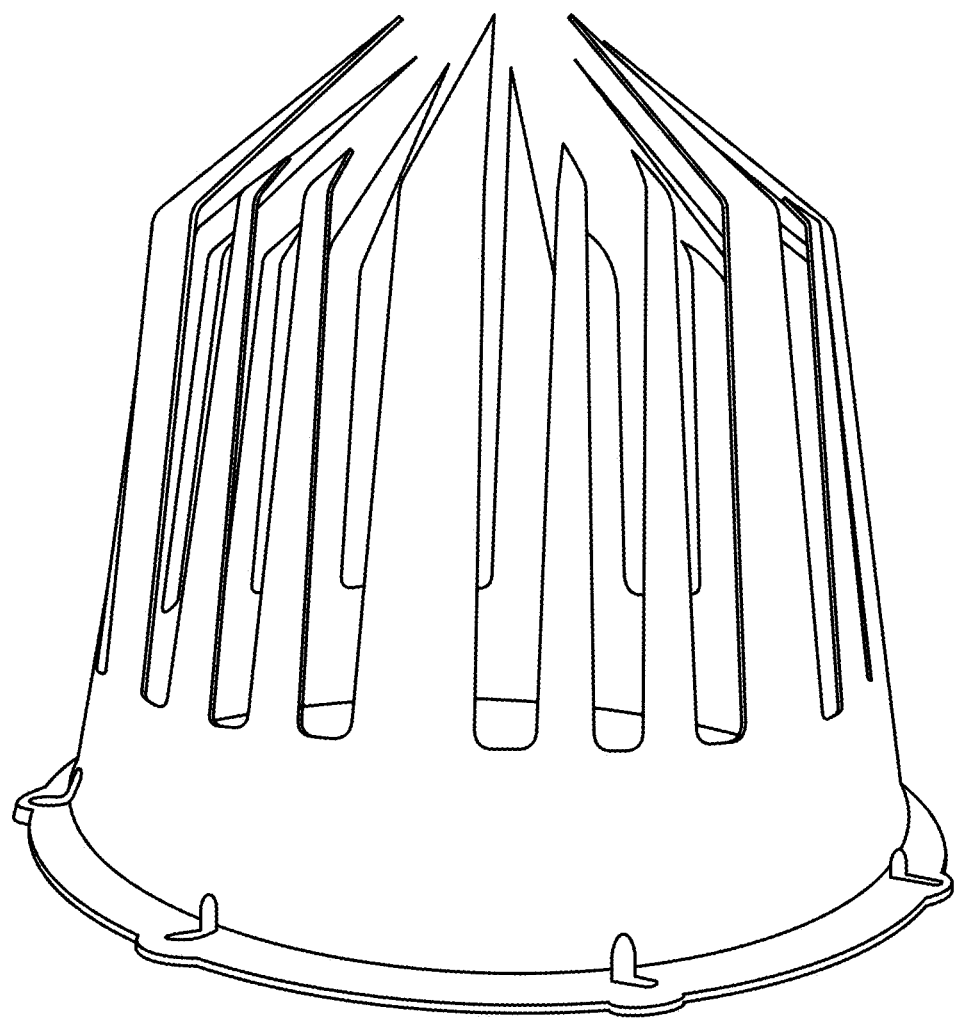
FIG. 20 shows a photo of a side view of the embodiment of FIG. 18.
Figure 21:
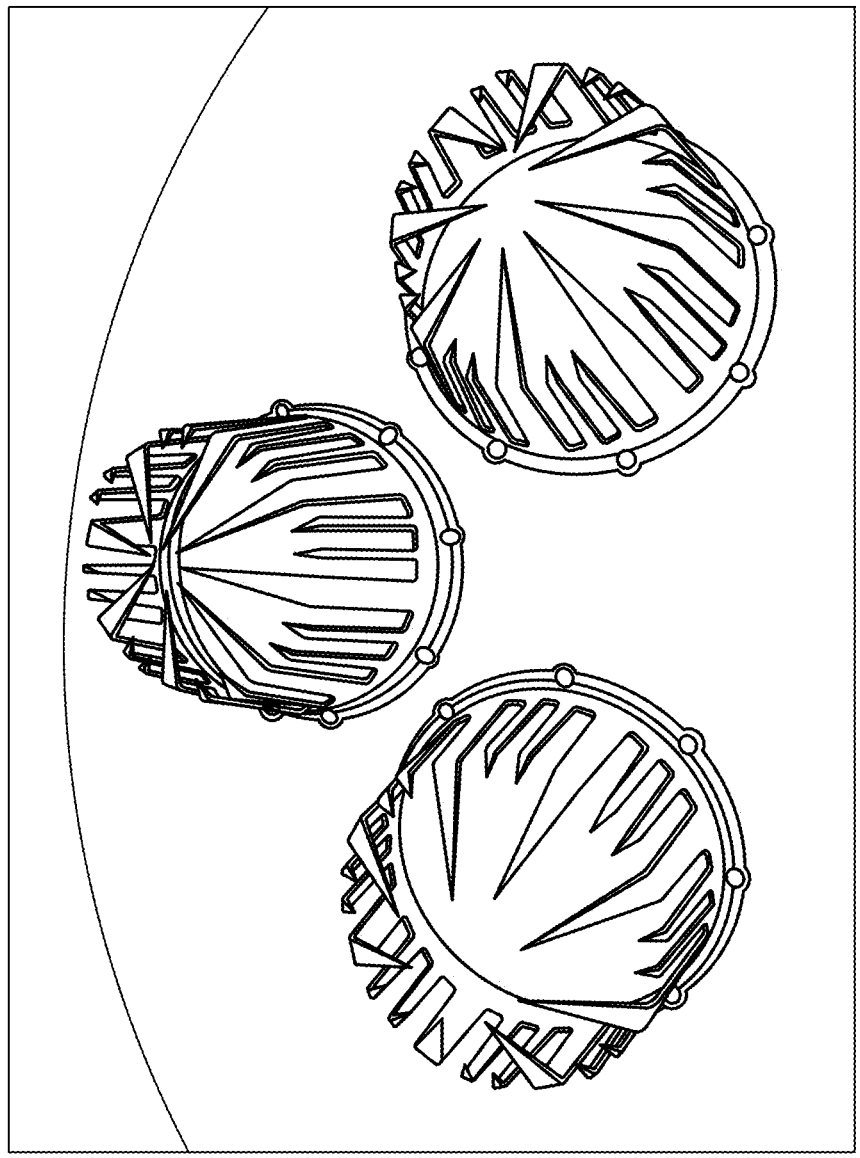
FIG. 21 shows a photograph of multiple constructs shown in FIG. 18.
Figure 22:
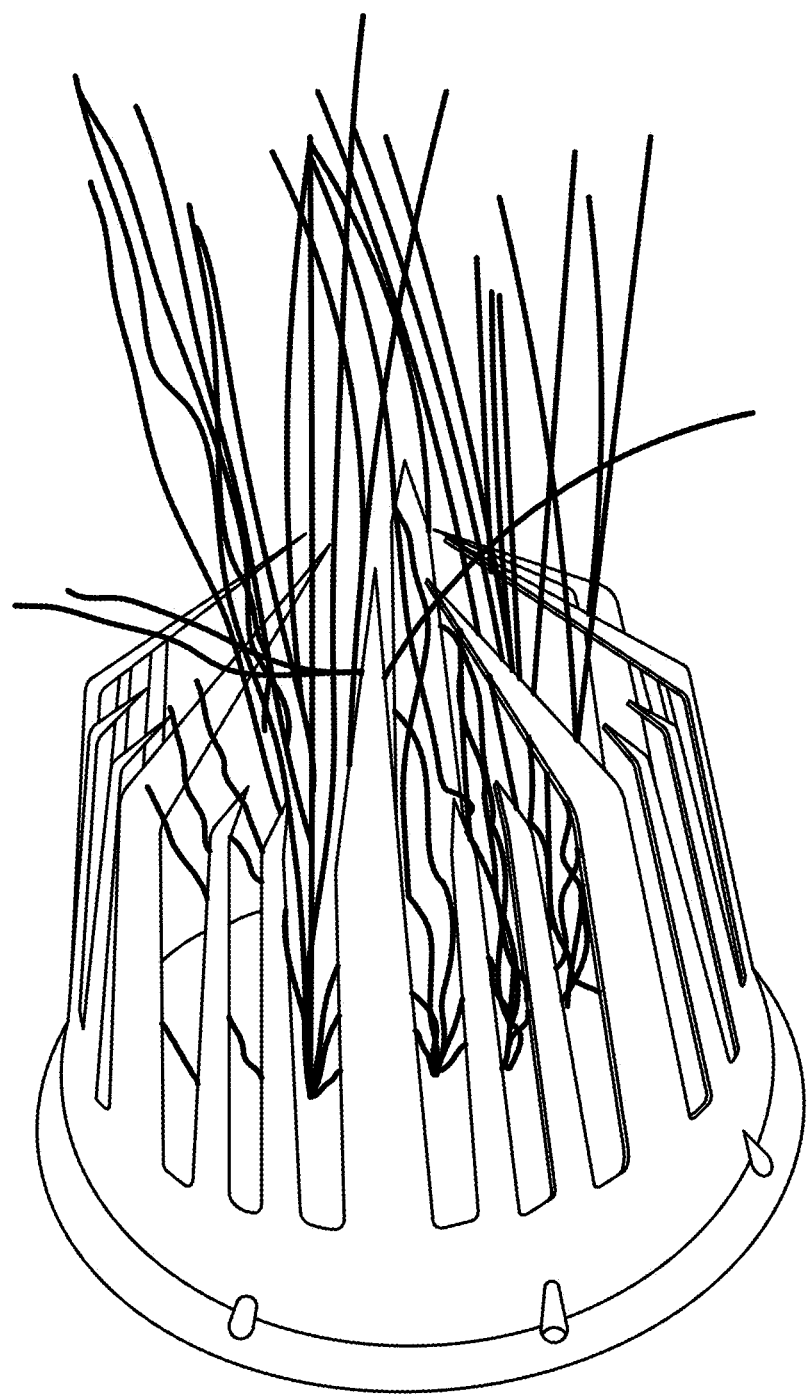
FIG. 22 shows a photograph of the protective device shown in FIG. 18 covering a seven month old seedling.
Figure 23:
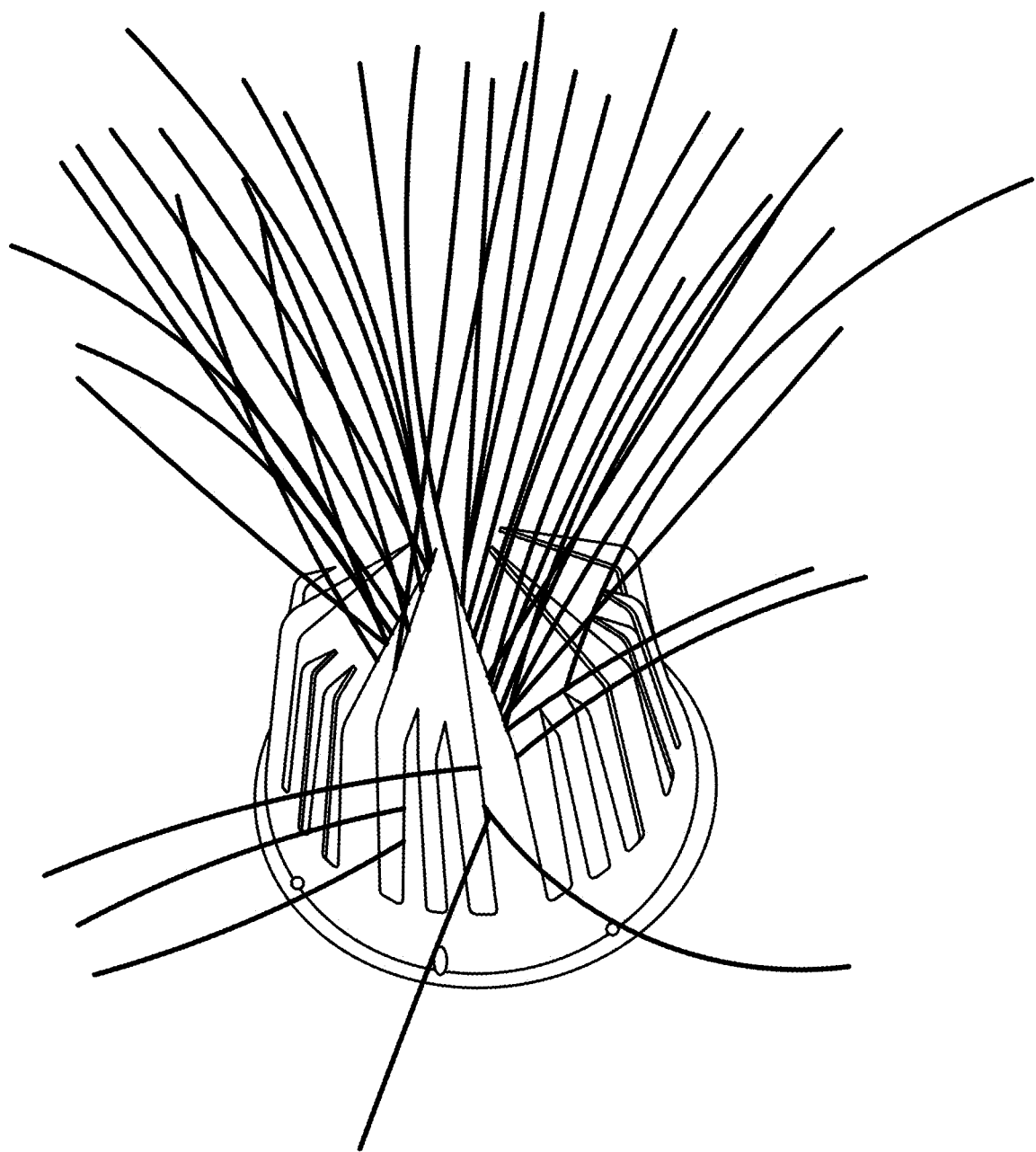
FIG. 23 shows a photograph of the protective device shown in FIG. 18 covering a two year old longleaf seedling.

FIG. 19 shows a photo of a downward view of the embodiment shown in FIG. 18. FIG. 20 shows a photo of a side view of the embodiment of FIG. 18. FIG. 21 shows a photograph of multiple constructs shown in FIG. 18. FIG. 22 shows a photograph of the protective device shown in FIG. 18 covering a seven month old seedling. FIG. 23 shows a photograph of the protective device shown in FIG. 18 covering a two year old sapling.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A protective device for seeds and seedlings comprising:
    a device base defining an open interior perimeter and at least one bottom opening;
    a solid perimeter boundary extending approximately perpendicular from the device base
    at least one primary palisade and at least one secondary palisade extending from the perimeter boundary, wherein the at least one primary palisade is longer than the at least one secondary defining at least one chasm between the at least one primary palisade and the at least one secondary palisade; a ratio of the combined at least one primary and at least one secondary palisade to the combined chasms between the palisades is approximately 50%;
    defining an interior of the protective device via the at least one primary palisade and the at least one secondary palisade;
    the at least one primary palisade and at least one secondary palisade each defining a sharpened spine truncating in a protective spike;
    the at least one primary palisade and at least one secondary palisade each defining an angled ledge that angles the sharpened spine and protective spike inward on the same plane with respect to the interior of the protective device;
    wherein a length of the at least one primary palisade is greater than a radius of the at least one bottom opening to form a ratio between the length of the at least one primary palisade length and the radius of the at least one bottom opening wherein bending of the at least one primary palisade into the open interior perimeter forms a shield with respect to a seed or seedling contained within the protective device; and
    wherein the length of the at least one primary palisade defines a gap between the at least one primary palisade and at least one opposing primary palisade of less than one inch until the at least one primary palisade is acted on by a force inward towards the interior or a force outward from the interior.

2. The protective device of claim 1, further comprising at least one score line defined into a device body of the protective device.

3. The protective device of clam 1, wherein the device base defines at least one stake opening.

4. The protective device of claim 1, wherein the protective device is biodegradable.

5. The protective device of claim 1, wherein the protective device is formed to melt when exposed to flame of approximately 200° F.

6. The protective device of claim 1, wherein two or more primary palisades are present and form an open end via a distal end of each of the two or more primary palisades angling toward one another.

7. The protective device of claim 6, wherein the open end is enclosed via a plurality of protective spikes forming a perimeter of the open end.

8. The protective device of claim 1, wherein the at least one chasm forms an unobstructed, uncovered opening allowing free flow of air and light into the protective device interior.

9. A method of making a protective device for seeds and seedlings comprising:
- forming a device base defining an open interior perimeter and at least one bottom opening;
- forming a solid perimeter boundary extending approximately perpendicular from the device base;
- forming at least one primary palisade and at least one secondary palisade extending from the perimeter boundary, and the at least one primary palisade is longer than the at least one secondary palisade;
- defining at least one chasm between the at least one primary palisade and the at least one secondary palisade defining an interior of the protective device, and
- a ratio of the combined at least one primary and at least one secondary palisade to the combined chasms between the palisades is approximately 50%;
- forming the at least one primary palisade and at least one secondary palisade to each define a sharpened spine truncating in a protective spike;
- forming the at least one primary palisade and at least one secondary palisade to each define an angled ledge that angles the sharpened spine and protective spike inward on the same plane with respect to the interior of the protective device;
- forming a length of the at least one primary palisade greater than a radius of the at least one bottom opening to form a ratio between the length of the at least one primary palisade length and the radius of the at least one bottom opening wherein bending of the at least one primary palisade into the open interior perimeter forms a shield with respect to a seed or seedling contained within the protective device; and
- further forming the length of the at least one primary palisade to define a gap between the at least one primary palisade and at least one opposing primary palisade of less than one inch until the at least one primary palisade is acted on by a force inward towards the interior or a force outward from the interior.

10. The method of making a protective device of claim 9, further comprising forming at least one score line into a device body of the protective device.

11. The method of making a protective device of clam 9, further comprising defining at least one stake opening in the device base.

12. The method of making a protective device of claim 9, further comprising forming the protective device to be biodegradable.

13. The method of making a protective device of claim 9, further comprising forming the protective device to melt when exposed to flame of approximately 200° F.

14. The method of making a protective device of claim 9, further comprising two or more primary palisades forming an open end via a distal end of each of the two or more primary palisades angling toward one another.

15. The method of making a protective device of claim 14, further comprising enclosing the open end with a plurality of protective spikes to form a perimeter of the open end.

16. A method for protecting a seed or seedling comprising:
- placing a protective device above a section of ground containing a seed or seedling, wherein the protective device comprises:
- a device base defining an open interior perimeter and at least one bottom opening;
- a solid perimeter boundary extending approximately perpendicular from the device base
- at least one primary palisade and at least one secondary palisade extending from the perimeter boundary and defining at least one chasm between the at least one primary palisade and the at least one secondary palisade defining an interior of the protective device; a ratio of the combined at least one primary and at least one secondary palisade to the combined chasms between the palisades is approximately 50%; the at least on primary palisade is longer than the at least one secondary palisade;
- the at least one primary palisade and at least one secondary palisade each defining a sharpened spine truncating in a protective spike;
- the at least one primary palisade and at least one secondary palisade each defining an angled ledge which causes the sharpened spine and protective spike to angle inward on the same plane with respect to the interior of the protective device;
- forming a length of the at least one primary palisade greater than a radius of the at least one bottom opening to form a ratio between the length of the at least one primary palisade length and the radius of the at least one bottom opening wherein bending of the at least one primary palisade into the open interior perimeter forms a shield with respect to a seed or seedling contained within the protective device; and
- further forming the length of the at least one primary palisade to define a gap between the at least one primary palisade and at least one opposing primary palisade of less than one inch until the at least one primary palisade is acted on by a force inward towards the interior or a force outward from the interior.

17. The method for protecting a seed or seedling of claim 16, further comprising staking the protective device to the section of ground containing a seed or seedling.

18. The method for protecting a seed or seedling of claim 16, further comprising forming the protective device to be biodegradable.

19. The method for protecting a seed or seedling of claim 16, further comprising forming the protective device to melt when exposed to flame of approximately 200° F.

20. The method for protecting a seed or seedling of claim 16, further comprising forming the open end enclosed via a plurality of protective spikes forming a perimeter of the open end.

* * * * *